United States Patent
Freudenberger

(10) Patent No.: US 12,076,829 B2
(45) Date of Patent: *Sep. 3, 2024

(54) MACHINE INTEGRATED POSITIONING SYSTEM

(71) Applicant: TRITON METAL PRODUCTS INC., Hamilton, IN (US)

(72) Inventor: John Freudenberger, Hamilton, IN (US)

(73) Assignee: TRITON METAL PRODUCTS INC., Findlay, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/965,486

(22) Filed: Oct. 13, 2022

(65) Prior Publication Data

US 2023/0035342 A1   Feb. 2, 2023

Related U.S. Application Data

(63) Continuation of application No. 16/539,276, filed on Aug. 13, 2019, now Pat. No. 11,590,623.

(Continued)

(51) Int. Cl.
*B23Q 17/00* (2006.01)
*B23Q 17/22* (2006.01)
*B23Q 17/24* (2006.01)

(52) U.S. Cl.
CPC ......... *B23Q 17/006* (2013.01); *B23Q 17/003* (2013.01); *B23Q 17/2291* (2013.01); *B23Q 17/2404* (2013.01); *B23Q 17/2423* (2013.01)

(58) Field of Classification Search
CPC ............... B23Q 17/003; B23Q 17/006; B23Q 17/2291; B23Q 17/2404; B23Q 17/2423

(Continued)

(56) References Cited

U.S. PATENT DOCUMENTS

| 3,828,318 A | 8/1974 | Bennett et al. |
| 4,856,903 A | 8/1989 | Kipphan et al. |

(Continued)

FOREIGN PATENT DOCUMENTS

| CN | 201974587 U | 9/2011 |
| CN | 102527876 A | 7/2012 |

(Continued)

OTHER PUBLICATIONS

Trumpf TruBend 7036 (40 ton electric) press break with laser, A photograph shown below and a video found at the link noted to the right utilize laser positioning with a press brake positioner., https://www.youtube.com/watch?v=bbMYcMzXmlc, (please go to the 6 min. 25 sec. position).

*Primary Examiner* — Behrooz M Senfi
(74) *Attorney, Agent, or Firm* — Jacob M. Ward; Ward Law Office LLC

(57) ABSTRACT

A machine integrated positioning system shows an operator where to place a raw part in the press brake or other machinery. Further, the operator is informed if the dimensions associated with the raw part are, or are not, correct to produce the planned finished part. The operator is visually shown how the raw part is to be oriented. The operator is informed if the raw part is right-side-up, along with other pre-final placement information. If these and other conditions are not met, the machine integrated positioning system may prevent the press brake and other machinery from cycling.

20 Claims, 3 Drawing Sheets

Related U.S. Application Data

Figure 1:
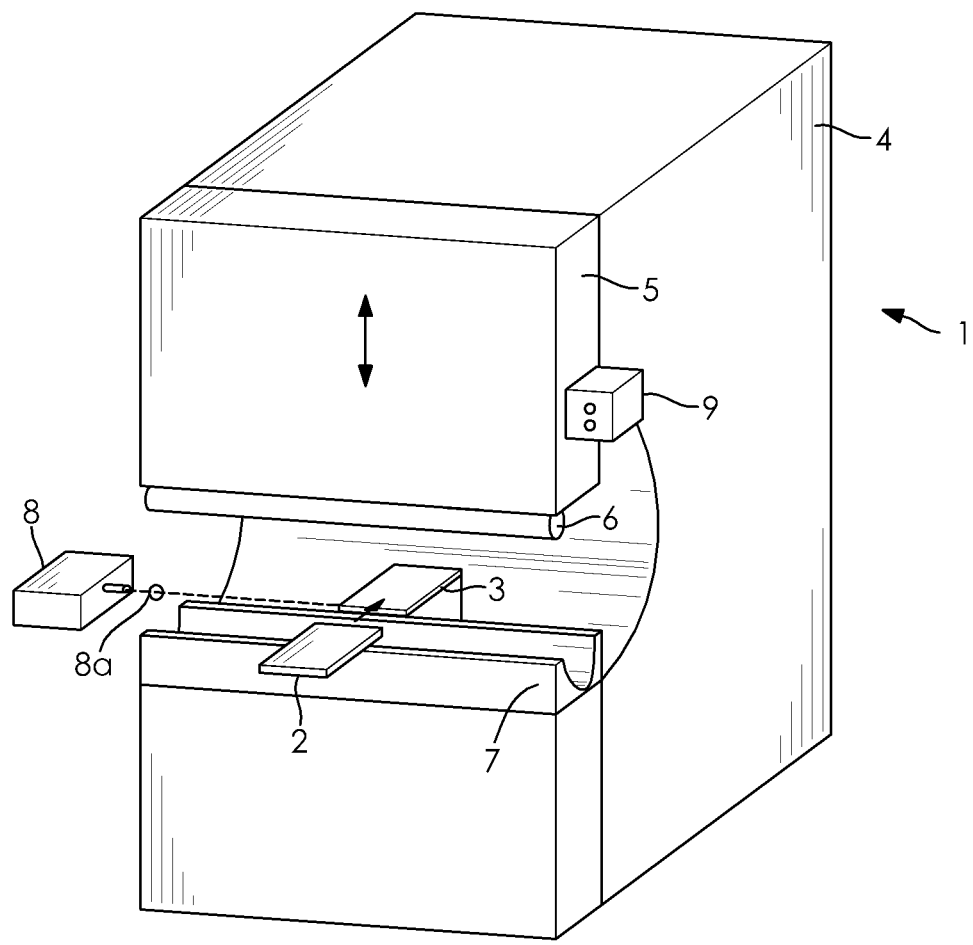

(60) Provisional application No. 62/718,101, filed on Aug. 13, 2018.

(58) Field of Classification Search
USPC .......................................................... 408/13
See application file for complete search history.

(56) References Cited

U.S. PATENT DOCUMENTS

| | | | |
|---|---|---|---|
| 5,822,207 A | 10/1998 | Hazama et al. | |
| 9,826,207 B2 | 11/2017 | Kaufman et al. | |
| 9,879,983 B2 | 1/2018 | Kaufman et al. | |
| 9,885,771 B2 | 2/2018 | Nagalla et al. | |
| 11,344,988 B2 | 5/2022 | Angerer et al. | |
| 11,590,623 B2 * | 2/2023 | Freudenberger | B21D 5/004 |
| 2003/0187548 A1 | 10/2003 | Sakhitab et al. | |
| 2006/0188127 A1 | 8/2006 | Reilley | |
| 2011/0234789 A1 | 9/2011 | Koike | |
| 2012/0262730 A1 | 10/2012 | Brown | |
| 2014/0253719 A1 | 9/2014 | Rueb | |
| 2017/0282321 A1 | 10/2017 | Wixey | |

FOREIGN PATENT DOCUMENTS

| | | | | |
|---|---|---|---|---|
| CN | 205607390 U | | 9/2016 | |
| CN | 107597981 A | | 1/2018 | |
| CN | 206925871 U | * | 1/2018 | ............. B25J 13/08 |
| DE | 102016120132 A1 | | 4/2018 | |
| EP | 1222975 A2 | * | 7/2002 | ............. B21D 5/002 |
| ES | 2395452 A1 | | 2/2013 | |
| WO | WO-2018039694 A1 | * | 3/2018 | ............. B21D 5/002 |

* cited by examiner

MACHINE INTEGRATED POSITIONING SYSTEM

CROSS-REFERENCE TO RELATED APPLICATIONS

This application is a Continuation of U.S. patent application Ser. No. 16/539,276, filed on Aug. 13, 2019, which claims the benefit of U.S. Provisional Application No. 62/718,101, filed on Aug. 13, 2018. The entire disclosure of the above application is hereby incorporated herein by reference.

FIELD

The present disclosure relates to parts forming machines and, more particularly, a system and method for ensuring placement of a raw part in a machine to correctly form a finished part.

BACKGROUND

The use of lasers in the machining industry is generally known. In particular, modern equipment with manufacturing parts will often employ lasers and associated sensors for safety reasons. For example, laser sensors may be used to determine if a person inadvertently moves to a high risk or dangerous area relative to the manufacturing equipment by crossing a light beam. In such situations, the equipment may be automatically stopped to ensure the safety of the person adjacent the equipment.

Conventional laser-vision positioning systems have also been employed to direct an operator where to place a raw part in a machine. However, these conventional laser positioning-vision systems do not, in advance, show an operator how to orient the raw part or inform the operator whether the raw part is upside down or backwards when installed into a part forming machine for manufacture of a finished part. This is especially a problem for non-symmetrical parts. Further, the known positioning systems do not, in advance of final placement in the machine, determine if the raw part is the correct part for a planned forming operation.

There is a need to integrate either laser or vision positioning systems with machinery, such as a press brake, so that these added concerns are addressed prior to final placement of the raw part in the machinery. Desirably, these systems would militate against a cycling of the press brake and other machinery if the above-noted conditions are not met.

SUMMARY

In concordance with the instant disclosure, a machine integrated positioning system, which operates in advance of placement or forming of a raw part or "blank" in a press brake and other machinery, is surprisingly discovered.

In one embodiment, a machine integrated positioning system includes a parts forming machine, a vision device, and a controller. The parts forming machine is configured to receive a raw part with a register mark from a raw parts station disposed adjacent to the parts forming machine into an initial forming position. The parts forming machine is also configured to, through an operation, form the raw part into a finished part for subsequent delivery to a finished parts station disposed adjacent to the parts forming machine. The vision device is disposed adjacent to the parts forming machine and configured to detect an alignment of the register mark of the raw part. The alignment of the raw part indicates at least one of a correct location and a correct orientation. The controller is in communication with the vision device. The controller and configured to permit the operation of the machine to form the raw part into the finished part where the register mark of the raw part is aligned, and to not permit the operation of the machine to form the raw part into the finished part where the register mark of the raw part is not aligned.

In a further embodiment, a machine integrated positioning system includes a parts forming machine, a light positioning device, a vision device, and a controller. The parts forming machine is configured to receive a raw part with a register mark from a raw parts station disposed adjacent to the parts forming machine into an initial forming position. By operation, the parts forming machine is also configured to form the raw part into a finished part for subsequent delivery to a finished parts station disposed adjacent to the parts forming machine. The light positioning device is affixed to the parts forming machine. The light positioning device is configured to project a light beam to at least one of the raw parts station, the initial forming position, and the finished parts station. The vision device is affixed to the parts forming machine. The vision device is configured to detect an alignment of the register mark of the raw part with the light beam projected by the laser device, and thereby an orientation of the raw part. The controller is in communication with the light positioning device and the vision device. The controller is configured to permit the operation of the machine to form the raw part into the finished part where the register mark of the raw part is aligned with the light beam, and to not permit the operation of the machine to form the raw part into the finished part where the register mark of the raw part is not aligned with the light beam.

For example, the controller could send a pass/fail signal, so that the machine is the one with the logic to control the machine advancement or not. In the case of a manual operation, the laser could tell the operator where to position and machine (e.g., weld) a part, then the vision system could tell the operator if it is correct or not. So, in this case the controller is not necessarily integrated into the machine, and can provide a passive or reactive feedback loop with a digital display. Alternatively, the controller could be integrated and not allow the machine to operate (e.g., strike an arc) if it detects an issue.

In another embodiment, the light positioning device is configured to project the light beam to each of the raw parts station, the initial forming position, and the finished parts station. The light positioning device may further be configured to project the light beam to an advanced placement position for the raw part. The advanced placement position is spaced apart from and disposed adjacent to the initial forming position for the raw part. The vision system may include camera for capturing an image of the register marks and the light beams for processing by the controller.

In a further embodiment, the light positioning device is movably attached to the parts forming machine. For example, the light positioning device may be disposed adjacent a top of the parts forming machine and is movable laterally toward each of the raw parts station and the finished parts station. The light positioning device may further be configured to move from a rearward position to a forward position. The rearward position is arranged above the advanced placement position for the raw part. The forward position is arranged above the initial forming position for the raw part.

In yet another embodiment, the parts forming machine includes a press brake. A press brake is a machine pressing tool for bending sheet and plate material, most commonly sheet metal. It forms predetermined bends by clamping the workpiece between a matching punch and die. Typically, two C-frames form the sides of the press brake, connected to a table at the bottom and on a movable beam at the top. The bottom tool is mounted on the table, with the top tool mounted on the upper beam. While the machine integrated positioning system may be especially advantageous with respect to press brake equipment, it also should be understood that the machine integrated positioning system may be used with other types of machines, and particularly other types of parts forming machines, within the scope of the present disclosure.

It should be appreciated that this system has the ability to work in conjunction with about any type of manufacturing operation, e.g., machining, stamping, turning, manual and robotic welding. The strength of the system lies with human interference. There are also other applications with programming the equipment and helping to visually see if there are problems with programs. The system would also help by creating points automatic programming to display the next point to move to in an operation.

In yet a further embodiment, a machining method may include a step of providing the machine integrated positioning system of the present disclosure. The method may include the further steps of moving the raw part to the initial forming position, and projecting, by the light positioning device, the light beam to the initial forming position. An orientation of the raw part may then be manually adjusted in order to align the register mark of the raw part with the light beam. An alignment of the register mark of the raw part with the light beam in the initial forming position is then detected, by the vision system. The alignment indicates the orientation of the raw part at the initial forming position is correct. The operation of the parts forming machine to form the raw part into the finished part is then permitted, by the controller in response to the alignment indicating the orientation of the raw part is correct. This check of the orientation of the raw part upon being inserted into the initial forming position can be helpful in minimizing scrap associated with mis-oriented raw parts. The operator may subsequently move the finished part from the parts forming machine to the finished parts station.

In an additional embodiment, the machining method may further include a step of projecting, by the light positioning device, a light beam to the raw parts station. This informs the operator where the raw part is to be efficiently and safely stored prior to the moving of the raw part from the raw parts station to the initial forming position. The positioning of the raw parts station may be predetermined based on efficiency in movement of the operator and safety considerations associated with the particular type of parts forming machine being employed. Likewise, the method may include a step of projecting, by the light positioning device, a light beam to the finished parts station. This informs the operator where the finished part is to be efficiently and safely stored upon the moving of the finished part from the parts forming machine to the finished parts station. As with the location of the raw parts station, the location of the finished parts station may be selected to ensure optimum efficiency and safety in the manufacturing process.

In particular embodiment, the manufacturing method may further include a step of moving the raw part from the raw parts station to an advanced placement position. This step will occur prior to the step of moving the raw part to the initial forming position. In this example, the method may also include steps of providing the light positioning device in a rearward position arranged above the advanced placement position, and then projecting, by the light positioning device, a light beam to the advanced placement position while in the reward position. An alignment of the register mark of the raw part with the light beam projected to the advanced placement position is then detected by the vision system. The alignment indicates the orientation of the raw part at the advanced placement position is correct. This pre-check of the orientation of the raw part prior to being inserted into the initial forming position can be helpful in minimizing scrap associated with mis-oriented raw parts. Following this pre-check, between the step of detecting, by the vision system, an alignment of the register mark with the light beam projected to the advanced placement position and the step of moving the raw part to the initial forming position, the method may include a step of moving the light positioning device from the rearward position to a forward position. In the forward position, the light positioning device may likewise be employed to check for the proper orientation of the raw part upon being moved to the initial forming position.

It should be appreciated that the manufacturing method further advantageously includes a step of not permitting, by the controller, the operation of the parts forming machine to form the raw part into the finished part when the alignment of the register mark of the raw part with the light beam in the initial forming position is not detected by the vision system. This automated prevention of a cycling of the parts forming machine until the correct orientation of the raw part has been confirmed further minimizes the manufacturing of defective finished parts and the accompanying scarp associated therewith. In another example, it should be understood that control for the cycling may be given to the operator, who will receive feedback on the alignment of the raw part via a display or other means such as a red light or green light to indicate correctness of location and/or orientation.

In yet another embodiment, the manufacturing method may include a step of projecting, by the light positioning system, a shaped image associated with a profile shape of the raw part to the initial forming position. This informs the operator if the dimensions associated with the raw part are correct or not. For example, if the raw part has a defect in shape or form, or is even an incorrect raw part for the application, it will not be circumscribed by the shaped image projected into the initial forming position.

In yet an additional embodiment, the manufacturing method may include a step of generating on a display in communication with the controller an identifier to confirm for the operator at least one of whether the orientation of the raw part at the initial forming position is correct, and whether the dimensions associated with the part are correct.

In still another embodiment, the manufacturing method may include a step of projecting, by the light positioning device, written instructions onto one of a floor adjacent to the parts forming machine and a surface of the parts forming machine. The written instructions may inform the operator on proper operation of the parts forming machine, for example. The written instructions may also include warnings relating to safety or actions that must be taken in order to proceed in the manufacturing method. A skilled artisan may select suitable written instructions to be projected by the light positioning device, as desired.

In still a further embodiment, the manufacturing method may include a step of projecting, by the light positioning device, a profile or outline of at least one human hand onto a surface of at least one of the raw part and the parts forming machine. The at least one profile of a human hand informs the operator on a location for safe placement of the hands of the operator during the operation of the parts forming machine.

In an exemplary embodiment, the machine integrated positioning system provides a combination of at least one of a laser positioning system and a vision system. Thereby, in advance of initiating a forming operation on a raw part in a press brake or other machinery, an operator can initiate a machine part program along with a laser-vision system that shows the operator where to place and orient raw parts in the machinery. This results in preventing the parts from being formed if the raw part is not properly placed in the machine.

Further, the operator may be informed if the dimensions associated with the raw part are or are not correct to produce the planned finished part. The operator may be visually shown how the raw part is to be oriented, to avoid allowing the raw part to be placed upside down or backwards. This is especially true for non-symmetrical parts in press brakes, where it is very easy to otherwise load the non-symmetrical part in upside down or backwards and by doing so the part is formed incorrectly. The operator may also be informed if the raw part has the correct orientation, e.g., is right-side-up. As a result, mistakes and scrap parts are avoided and correct final parts are ensured.

The vision system could measure the part and ensure it is correct as well. The laser system could show the profile view of the final part after manufacturing and operators could visually see what is wrong by holding the part in the correct location. The vision system could further auto adjust the machine so the next part will be produced correctly.

The feedback and controls of the machine integrated positioning system allow for projection onto a floor therearound the machine so that large raw parts, unique featured raw parts, and two-man operators can be better controlled than current systems. Also, the added controls provided by the positioning system informs an operator when to grab a part to avoid pinched fingers. The system may also facilitate a loading and an unloading of parts, stack locations for the raw parts to be finished, provide special notes to the operator by projections, such as tooling notes, locations, correct tooling, and the like. The system may also direct the operator by projections where to stand and hold the parts.

This machine integrated positioning system, however, is not limited to only the above-stated pre-final placement conditions. If any one of these pre-final conditions is not met, the machine integrated positioning system may prevent the press brake and other machinery from cycling.

In a particular embodiment, the system incorporates into a parts-making program, for a press brake or other machinery, added examination of a raw part that utilizes laser positioning to visually show an operator where to place the raw part. This added examination is done in advance of final placement of the raw part in a press brake or other machinery. The advance parts-making programming includes, for example, the projection of laser lines to accomplish at least one of the following: 1) where to place the raw part, 2) if its position is correct, 3) if the raw part is upside-down or right-side-up, 4) if its orientation is correct, and 5) if general dimensions of the raw part are correct for forming a desired output part. The programming may be devised in order to optimize an efficiency of part production. The system may also include the projection of laser to form words or a message, and even outlines of hands to indicate proper placement.

These various functions are accomplished before final placement of the raw part in its proper position for forming. Subsequently, the examination can then be interfaced with existing vision systems, which do not incorporate such advanced part-making programming, or permit manual cross checks by an operator. Thereby, press brakes and other machinery are prevented from cycling if the raw part has not been fully examined or is improperly oriented prior to a cycling of the machinery. Thus, final parts are better formed to avoid excess scrap and damage to the machinery.

DRAWINGS

The above, as well as other advantages of the present disclosure, will become clear to those skilled in the art from the following detailed description, particularly when considered in the light of the drawings described hereafter.

Figure 2:
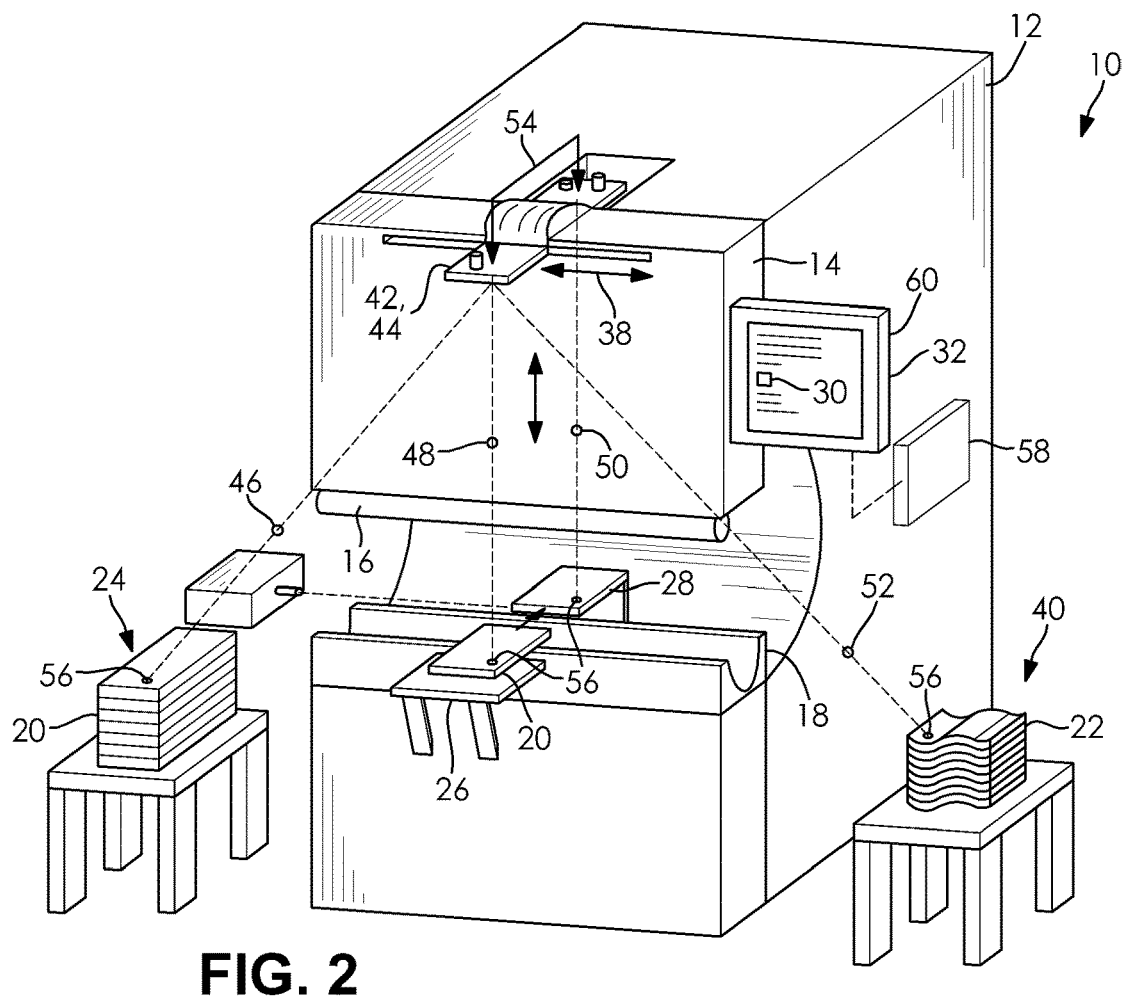
Figure 3:
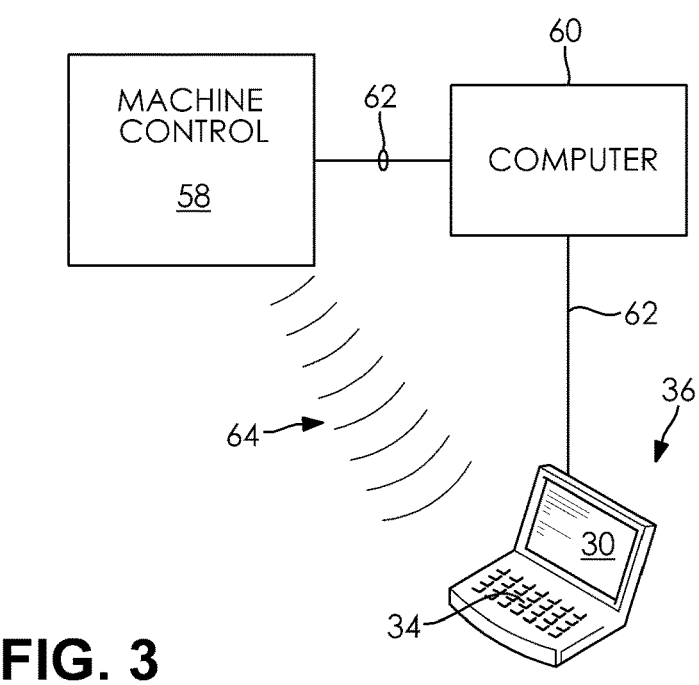
Figure 4:
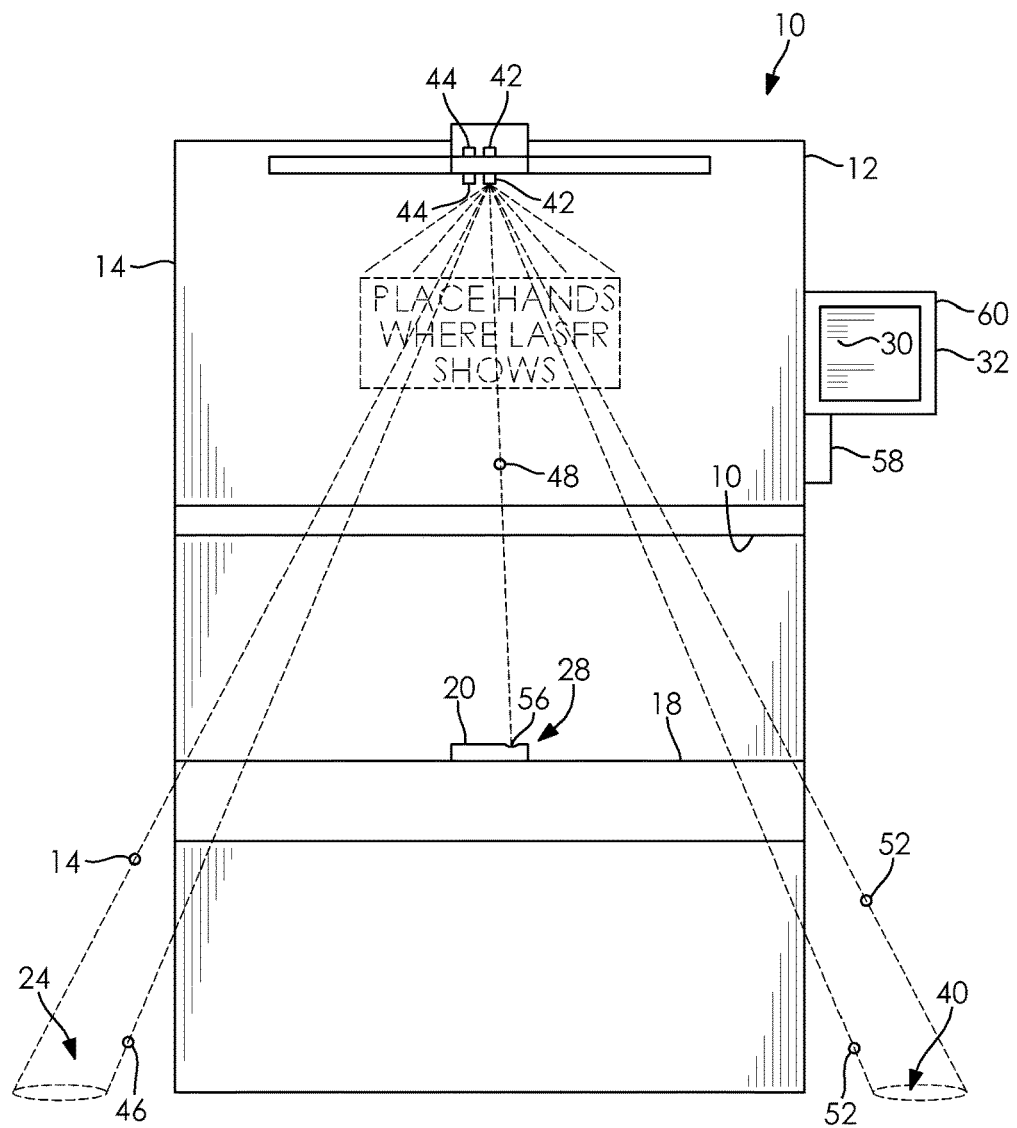
Figure 5:
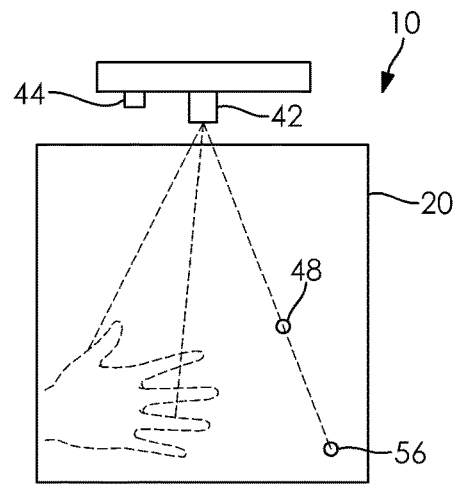

FIG. 1 is a top perspective view of a machine according to the prior art, the machine being press brake equipment without a laser or vision positioning system;

FIG. 2 is a top perspective view of a machine with an integrated positioning system according to the present disclosure, the machine being press brake equipment disposed between adjacent stations for incoming raw parts and outgoing finished parts and projecting a laser to confirm a correct orientation of a raw part inserted into the machine; and FIG. 3 is a schematic of a control system for the machine integrated positioning system shown in FIG. 2;

FIG. 4 is a front perspective view of the machine integrated positioning system shown in FIG. 2, and further illustrating a projection of laser instructions and images by the light positioning device; and FIG. 5 is a top plan view of a raw part in the machine integrated positioning system shown in FIG. 2, and further illustration of a projection of images by the light positioning device onto a surface of the raw part.

DETAILED DESCRIPTION

The following description is merely exemplary in nature and is not intended to limit the present disclosure, application, or uses. Throughout the drawings, corresponding reference numerals indicate like or corresponding parts and features. In respect of the methods disclosed, the order of the steps presented is exemplary in nature, and thus, is not necessary or critical unless otherwise disclosed.

As seen in FIG. 1, there is illustrated a prior art machine or system 1 that merely directs an operator (not shown) on where a raw part 2 is to be placed in an initial forming position 3, within a CNC press brake 4 (see arrow pointing therein). The press brake 4 has a ram 5 with an upper die 6 and a lower die 7. The system 1 may incorporate a laser device or a vision device 8, for example, that projects a beam 8a to inform the operator on where to generally place the raw part 2 in the initial forming position 3 and possible subsequent forming positions. For example, the operator may align an edge of the raw part 2 with the projected beam 8a in order to ensure the raw part 2 has been pushed into the press brake 4 to a proper location for forming. Also shown is a start-stop control box 9 that the operator uses to control the ram 5. As established hereinabove, the system 1 of the prior art is prone to having the operator load the raw part 2 into the press brake 4 in an incorrect orientation, regardless of whether the raw part 2 is in the correct position. The system 1 of the prior art also does not contemplate directing the operator to stations for incoming raw parts or outgoing finished parts for optimized efficiency in production of the finished parts.

A machine integrated positioning system 10 according to various embodiments of the present disclosure is illustrated in FIGS. 2-5. The positioning system 10 works in conjunction with a press brake 12 or other machinery (not shown). Although the press brake 12 is shown and described herein, for purpose of illustrating the machine integrated positioning system 10 of the present disclosure, it should be appreciated that the machine integrated positioning system 10 may be used with other suitable types of machinery and equipment, as desired. The terms "form" or "forming" as used herein is also defined to include any operation used for manufacturing the finished part 22 from the raw part 20, and can include operations such as bending, stamping, molding, cutting, welding, removing material, adding material, and the like, as non-limiting examples.

As shown in FIG. 2, the press brake 12 has a ram 14 which has an upper die 16 and a lower die 18. To form a raw part 20 into a finished part 22, an operator or an automated system like a robot (not shown) moves the raw part 20 from a raw parts station 24 thereof to an initial forming position 28, and then subsequently to an outgoing or finished parts station 40 containing the finished parts 22. It should be appreciated that the raw part 20 in FIG. 2 spans the bottom die 18 where in the initial forming position 28. In an optional embodiment, the raw part 20 may be moved to an advanced placement position 26, which is in advance (i.e., prior) to the initial forming position 28. The raw parts station 24 is shown to the left of the press brake 12. The advanced placement position 26 is represented by a stand, which could take other forms.

It should be appreciated that the advanced placement position 26 may not be necessary in certain embodiments, depending on part shape and geometry, as all the necessary checks can be caused to happen at the initial forming position 28. Often, in the forming operation, there will also be a back gage (not shown) to push the raw part 20 against, but operators may still mis-position the raw part 20. So, the initial forming position 28 becomes crucial. Furthermore, some raw parts 20 are hard to position because of their geometry, so the positioner will allow them to more precisely position parts to make more consistent and tighter tolerance parts.

The positioning system 10 further comprises at least one light positioning device 42 and a vision device 44 that operate in unison. Although the light and vision devices 42, 44 are shown in FIGS. 2 and 4 being movably affixed to the press brake 12, it should be appreciated that these components may be provided on a separate structure, such as a stand or frame, that is spaced apart from the press brake 12. The light positioning device 42 is configured to create a light beam and the vision device 44 is configured to detect light and images. Although laser beams are described as a specific type of the light beam herein, it should be understood that other types of light sources are considered to be within the scope of the disclosure. It should be appreciated that the light positioning device 42 and the vision device 44 may be provided separately and be spaced apart from one another, or may be provided together as single unitary component of the system 10, as desired. As shown in FIG. 2, the light and vision devices 42, 44 are typically placed above the initial forming position 28 for interaction with the raw parts 20 and finished parts 22, as shown by four dashed lines 46, 48, 50, 52.

The light positioning device 42 of the present disclosure may include a laser projector that is configured to generate and emit at least one light beam. The laser projector may be configured to project changing light beams to at least one of the initial forming position 26, the advanced placement position 26, the raw parts station 24, the finished parts station 40, the floor adjacent to the press brake 12, and one or more surfaces of the press brake 12 itself. The light beams may create a stationary or moving point, image, letters and numbers, or words as described further herein. The laser projector may include a housing that contains lasers, actuators or motors connected to movable mirrors to steer the light beams, galvanometer scanners, and other optical components. The laser projector can contain one laser light source for single-color projection or three sources for RGB (red, green, and blue) full color projection. One of ordinary skill in the art may also select other suitable types of components and systems for the light positioning device 42, as desired.

In certain example, it should be appreciated that the vision device 44 may be employed without the light positioning device 42, for example, by capturing images using ambient light available. However, it should be appreciated that the use of the light positioning device 42 does present certain advantages, including providing the operator with an easy visual on the positioning and orientation of the raw and finished parts 20, 22 throughout the operation.

The vision device 44 of the present disclosure may include a digital camera with an optical system such as a lens with a variable diaphragm and shutter to focus light onto an image pickup device having at least one image sensor. The diaphragm and shutter admit the correct amount of light to the image sensor. The digital camera can include at least one of a wide-angle lens and a telephoto lens to take images of both the area of the system 10 as a whole and also of a focused area of just the raw part 20. The digital camera can display images on a display 30 immediately after being recorded, for example, and store and delete images from memory. A skilled artisan may also select other suitable types of components and systems for the vision device 44 within the scope of the present disclosure.

It should be appreciated that the vision device 44 may further be employed to also record work, mistakes, time, and efficiencies. This information could work in conjunction with an ERP or MRP system or similar systems to record work and production rates and used for problem solving issues talking to other team members at another facility. Advantageously, such recording could also be used for training, and in the case as machines become more automated, could help training programmers on how to better program.

As represented by a first double arrowed line 54, which is shown above the press brake 12 in FIG. 2, the light and vision devices 42, 44 can be moved from a position within the top of the press brake 12 to a position just outside of the front top of the press brake 12. For example, the light and vision devices 42, 44 may be connected to a rotating drum that can be rotated by an actuator or motor to move the light and vision devices 42, 44 from a rearward position (disposed above the advanced placement position 26) to a forward position (disposed above the initial forming position 28). This can be done automatically by the controller 60, or manually by the operator, with the one or more of the light and vision devices 42, 44 placed high enough to see it all. By moving the light and vision devices 42 to the rearward position just outside of the front of the press 12, the light and vision devices 42, 44 are then capable of viewing and sensing various features associated with individual raw parts 20, finished parts 22, and stacks 24, 40 of the parts 20, 22 of all sizes, shapes, and placements.

Examples of features of the parts 20, 22 and stacks 24, 40 to be used in at least one of positioning and orienting the parts 20, 22 throughout the manufacturing process are register marks 56. The register marks 56 may be defined by holes, indentations, internal profiles or shapes, reflective material, lettering, barcodes, and safety notes, as non-limiting examples. For orientation purposes, it may be particularly useful to have more than one register mark 56, although a single one of the register marks 56 is shown in FIGS. 2-5 for simplicity of illustration. The register marks 56 relate to a variety of part characteristics, for example, dimensions, thickness, quantity of parts 20, 22 in the stacks 24, 40, part surface characteristics, orientation, placement, and upside and downside characteristics, to name just a few. In particular, where the raw part 20 is not symmetrical, the register mark 56 may be offset from a lateral centerline of the raw part 2 so that a location of the register mark 56 may be used to confirm a correct orientation of the raw part 2 at various points throughout the manufacturing process. In another example, the register mark 56 could be the overall shape or profile of the raw part 2 such that a non-alignment of the overall shape or profile can be indicative of at least one of the location and the orientation of the raw part 2 being incorrect and requiring intervention by the operator prior to the forming process. One skilled in the art may also select other suitable types, numbers, features, or locations for the register marks 56 within the scope of the present disclosure.

In a further example, the light positioning device 42 may be employed to project an actual image of the raw part 2 to the initial forming position 28. This may assist the operator in the locating and orientation of the raw part 2, such that the projected image effectively is superimposed over the raw part 2 and not otherwise noticeable where in exact alignment with the raw part 2. This can be detected by the vision device 44, or simply may be provide a visual aid to the operator to ensure proper placement, prior to the cycling of the machine.

As a further representation of movement of the light and vision devices 42, 44, a second double arrow headed line 38 is shown horizontally to the right outside top front of the press brake 12 in FIG. 2. This indicates that the light and vision devices 42, 44 can be laterally moved to various positions to the sides of the initial forming position 28, for example, along a channel or rail of the machine 12 by operation of an actuator or motor, but preferably across the outside top of the press brake 12. In these outside positions, the light and vision devices 42, 44 are then capable of monitoring and detecting the above-stated features and characteristics of the parts 20, 22 in the stacks 24, 40 and in the advanced placement position 26 and the initial forming position 28. These capabilities have not been provided thus far in the art.

If the machine integrated positioning system 10 detects any defects or cautionary features and characteristics, such as a misalignment of one of the register marks 56, the operator is informed by way of an alarm or warning or a message 30 that may be provided on a mounted touch terminal 32 or a separate terminal 36. The warning provides feedback to the operator to stop the process and reassess the location or orientation of the raw part 20. The system 10 may not allow the press brake 12 to proceed in its forming operations, i.e., the system 10 prevents a cycling of the press brake 12, until the defects are properly handled.

A controller 58 of the system may be provided with suitable software or logic for operation of the system. In particular, the controller 58 may include at least one processor and at least one memory. The memory may be a computer readable medium having non-transitory processor-executable instructions tangibly embodied thereon.

Advantageously, the present disclosure includes an integration of the controls for the light and vision devices 42, 44 with the machine controls when the part programs are pulled up on the terminals 32, 34, 36. The terminals 32, 34, 36 may have a human interface such as a touch terminal 32 or keyboard 34, as shown in FIG. 3. FIGS. 2 and 3 further illustrate the controller 58 that communicates with the mounted touch terminal 32 or the separate terminal 36 by way of a separate computer 60, or that the computer 60 may be embedded in either the controller 58 or the terminals 32, 36. The terminals 32, 36 may be integrated into the machine controllers, for example. The connections between the controller 58 and the terminals 32, 36 can be by way of hard wiring 62 or a remote wireless connection 64, as desired.

In operation, if there are no defects or cautionary features and no negative characteristics found by the system 10, associated with the raw parts 20, which would be detected by signals from the dashed lines 46, 48, then the operator may cause the machine to operate and form the finished part 22. Alternatively, the operator may move the raw part 20 from the initial placement position 26 to the final placement position 28. At this point, the light and vision devices 42, 44 are moved into a position in view with the dashed line 50. In this position, the system 10 will view and sense various features associated with the raw part 20 as the upper die 16 moves vertically downward toward the lower die 18 to make initial intimate contact with the raw part 20. This intimate contact and possible additional contacts form a desired final form(s) of the finished part 22, wherein the operator might subsequently place the finished part 22 on the stack 40 thereof, in preparation for ensuing operations.

If, at any point within the above-stated process, the system 10 detects a defect, then the process steps may be halted, and further cycling stopped until corrections are made.

In a further example, shown in FIGS. 4 and 5, the light positioning device 42 may be further employed to project written instructions onto one of a floor adjacent to the parts forming machine 12 and a surface of the parts forming machine 12. The written instructions may inform the operator on proper operation of the parts forming machine 12. The light positioning device 42 may also be used to project a profile or outline of at least one human hand onto a surface of one of the raw part 20 and the parts forming machine 12. The profile or outline informs the operator on a location for safe placement of the hands of the operator during the operation of the parts forming machine 12. It should be appreciated that each of the projection of the written instructions and the profile or outline of human hands for placement purposes may be controlled by the controller 58 and may be predetermined by programming or selection through the terminals 32, 34, 36 depending on the finished part 22 to be manufactured. This may further help in positioning tooling in the correct location and/or ensure the correct tooling is in the proper location, for example, the upper and lower punches and dies in a press brake machine.

Advantageously, the machine integrated positioning system 10 of the present disclosure operates in advance of forming of the finished part 22 from the raw part 20 in the parts forming machine 12 such as the press brake or other machinery, to minimize the manufacture of defective finished parts and scrap.

While certain representative embodiments and details have been shown for purposes of illustrating the invention, it will be apparent to those skilled in the art that various changes may be made without departing from the scope of the disclosure, which is further described in the following appended claims.

What is claimed is:

1. A machine integrated positioning system, comprising:
a parts forming machine configured to receive a raw part with a register mark from a raw parts station disposed adjacent to the parts forming machine into an initial forming position and, through an operation of the parts forming machine, form the raw part into a finished part for subsequent delivery to a finished parts station disposed adjacent to the parts forming machine;
a light positioning device that is rotatably disposed adjacent to the parts forming machine and configured to project a light beam to at least one of the raw parts station, the initial forming position, and the finished parts station, wherein the light positioning device is configured to project the light beam to each of the raw parts station, the initial forming position, and the finished parts station; and
a controller in communication with the light positioning device and configured to permit the operation of the machine to form the raw part into the finished part and control movement of the light positioning device to allow projection of the light beam to each of the raw parts station, the initial forming position, and the finished parts station.

2. The machine integrated positioning system of claim 1, wherein the light positioning device is further configured to project the light beam to an advanced placement position for the raw part, the advanced placement position spaced apart from and disposed adjacent to the initial forming position for the raw part.

3. The machine integrated positioning system of claim 2, wherein the light positioning device is movably attached to the parts forming machine.

4. The machine integrated positioning system of claim 3, wherein the light positioning device is disposed adjacent a top of the parts forming machine and is movable laterally toward each of the raw parts station and the finished parts station.

5. The machine integrated positioning system of claim 4, wherein the light positioning device is further configured to move from a rearward position arranged above the advanced placement position for the raw part to a forward position arranged above the initial forming position for the raw part.

6. The machine integrated positioning system of claim 1, wherein the parts forming machine includes a press brake.

7. The machine integrated positioning system of claim 1, further comprising a vision device disposed adjacent to the parts forming machine and configured to detect an alignment of the register mark of the raw part, the alignment of the raw part indicating at least one of a correct location and a correct orientation.

8. The machine integrated positioning system of claim 7, wherein the vision device includes a camera for capturing an image of the register mark for processing by the controller.

9. A machine integrated positioning system, comprising:
a parts forming machine configured to receive a raw part with a register mark from a raw parts station disposed adjacent to the parts forming machine into an initial forming position and, through an operation of the parts forming machine, form the raw part into a finished part for subsequent delivery to a finished parts station disposed adjacent to the parts forming machine;
a light positioning device rotatably affixed to the parts forming machine and configured to project a light beam to at least one of the raw parts station, the initial forming position, and the finished parts station, wherein the light positioning device is configured to project the light beam to each of the raw parts station, the initial forming position, and the finished parts station;
a controller in communication with the light positioning device and the vision device and configured to permit the operation of the machine to form the raw part into the finished part and control movement of the light positioning device to allow projection of the light beam to each of the raw parts station, the initial forming position, and the finished parts station.

10. The machine integrated positioning system of claim 9, wherein the light positioning device is further configured to project the light beam to an advanced placement position for the raw part, the advanced placement position spaced apart from and disposed adjacent to the initial forming position for the raw part.

11. The machine integrated positioning system of claim 10, wherein the light positioning device is movably attached to the parts forming machine.

12. The machine integrated positioning system of claim 11, wherein the light positioning device is adjustable affixed adjacent a top of the parts forming machine and is movable laterally toward each of the raw parts station and the finished parts station.

13. The machine integrated positioning system of claim 12, wherein the light positioning device is further configured to move from a rearward position arranged above the advanced placement position for the raw part to a forward position arranged above the initial forming position for the raw part.

14. The machine integrated positioning system of claim 9, wherein the parts forming machine includes a press brake.

15. The machine integrated positioning system of claim 9, further comprising a device affixed to the parts forming machine and configured to detect an alignment of the register mark of the raw part with the light beam projected by the light positioning device and thereby an orientation of the raw part.

16. The machine integrated positioning system of claim 15, wherein the device is a vision device.

17. The machine integrated positioning system of claim 16, wherein the vision device includes a camera for capturing an image of the register mark for processing by the controller.

18. The machine integrated positioning system of claim 1, wherein the light positioning system is configured to project a shaped image associated with a profile shape of the raw part to the initial forming position to inform the operator if dimensions associated with the raw part are correct.

19. The machine integrated positioning system of claim 1, further comprising a display, in communication with the controller, configured to generate an identifier to confirm for the operator at least one of whether an orientation of the raw part at the initial forming position is correct, and whether dimensions associated with the part are correct.

20. the machine integrated positioning system of claim 1, wherein the light positioning device disposed on a rotating drum and moveable between a rearward position and a forward position.

* * * * *